(12) United States Patent
Roumier et al.

(10) Patent No.: US 11,445,124 B2
(45) Date of Patent: Sep. 13, 2022

(54) OBJECT DETECTION SYSTEM FOR A MOTOR VEHICLE

(71) Applicant: APTIV TECHNOLOGIES LIMITED, St. Michael (BB)

(72) Inventors: Cyril Roumier, Asnieres sur Seine (FR); Guillaume Tournabien, Saint Soupplets (FR)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/847,702

(22) Filed: Apr. 14, 2020

(65) Prior Publication Data

US 2020/0336644 A1 Oct. 22, 2020

(51) Int. Cl.
| | |
|---|---|
| *H04N 5/235* | (2006.01) |
| *G06T 7/70* | (2017.01) |
| *B60Q 1/00* | (2006.01) |
| *B60Q 1/08* | (2006.01) |
| *H04N 5/225* | (2006.01) |
| *H04N 7/18* | (2006.01) |

(52) U.S. Cl.
CPC ......... *H04N 5/2354* (2013.01); *B60Q 1/0023* (2013.01); *B60Q 1/08* (2013.01); *G06T 7/70* (2017.01); *H04N 5/2253* (2013.01); *H04N 5/2256* (2013.01); *H04N 7/18* (2013.01); *B60Q 2400/20* (2013.01); *G06T 2207/30252* (2013.01)

(58) Field of Classification Search
CPC .............................. B60Q 1/0023; H04N 5/235
USPC ........................................................ 348/148
See application file for complete search history.

(56) References Cited

U.S. PATENT DOCUMENTS

| | | | |
|---|---|---|---|
| 9,975,471 B2 | 5/2018 | Bopp et al. | |
| 2010/0165102 A1* | 7/2010 | Klebanov | B60Q 1/115 348/135 |

(Continued)

FOREIGN PATENT DOCUMENTS

| | | |
|---|---|---|
| CN | 105492252 A | 4/2016 |
| CN | 107371296 A | 11/2017 |

(Continued)

OTHER PUBLICATIONS

Search Report for French Application No. FR1904156 dated Jan. 16, 2020.

(Continued)

*Primary Examiner* — Amir Shahnami
(74) *Attorney, Agent, or Firm* — Carlson, Gaskey & Olds, P.C.

(57) ABSTRACT

A vision system for a motor vehicle includes an optical image capture device configured to capture images of objects in its field of vision. A lighting device includes a plurality of lighting elements forming a lighting matrix configured to illuminate the field of vision of the optical device. A control device associated with the optical device and the lighting device is configured to determine the nature of each image of an object captured by the optical device. The control device is configured to locate the object, select the lighting elements of the lighting matrix capable of illuminating the object relative to the location of the object, and individually control at least one lighting characteristic of each selected lighting element so as to be able to determine the nature of the image of the object captured by the optical device.

14 Claims, 2 Drawing Sheets

(56) References Cited

U.S. PATENT DOCUMENTS

| | | | |
|---|---|---|---|
| 2016/0082877 A1* | 3/2016 | Oberhammer | B60Q 1/0023 |
| | | | 348/46 |
| 2017/0083774 A1 | 3/2017 | Solar et al. | |
| 2017/0113599 A1* | 4/2017 | Park | B60Q 1/085 |
| 2019/0184890 A1* | 6/2019 | Kuehnle | B60Q 1/1423 |
| 2019/0351818 A1* | 11/2019 | Roehm | B60Q 1/085 |
| 2019/0370568 A1* | 12/2019 | Matsunaga | G01S 7/41 |
| 2020/0053857 A1* | 2/2020 | Chen | H05B 47/105 |
| 2020/0164814 A1* | 5/2020 | Solar | H04N 7/183 |

FOREIGN PATENT DOCUMENTS

| | | |
|---|---|---|
| CN | 107514576 A | 12/2017 |
| CN | 108810421 A | 11/2018 |
| DE | 102016225280 A1 | 6/2018 |
| WO | 2018/103875 A1 | 6/2018 |

OTHER PUBLICATIONS

First office action for CN Application No. 202010268857.7 dated May 8, 2021.

\* cited by examiner

[Fig. 1]
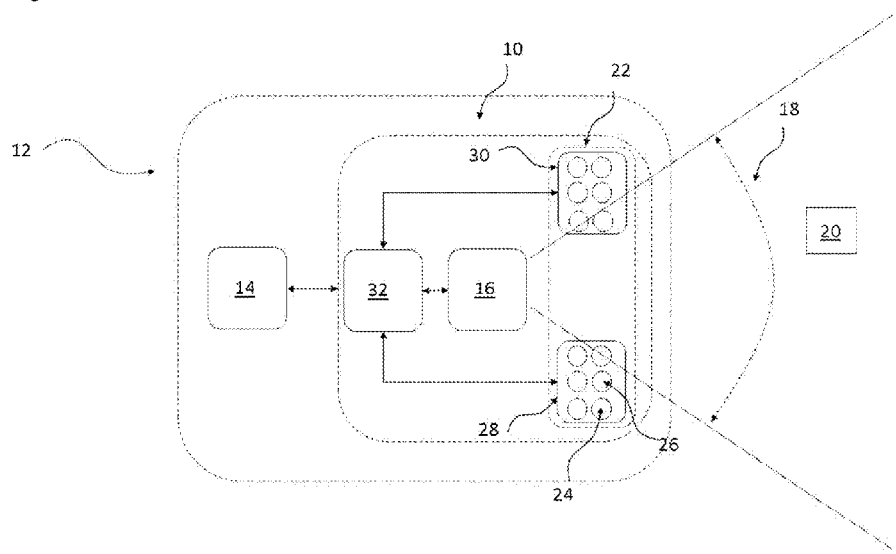
[Fig. 2]
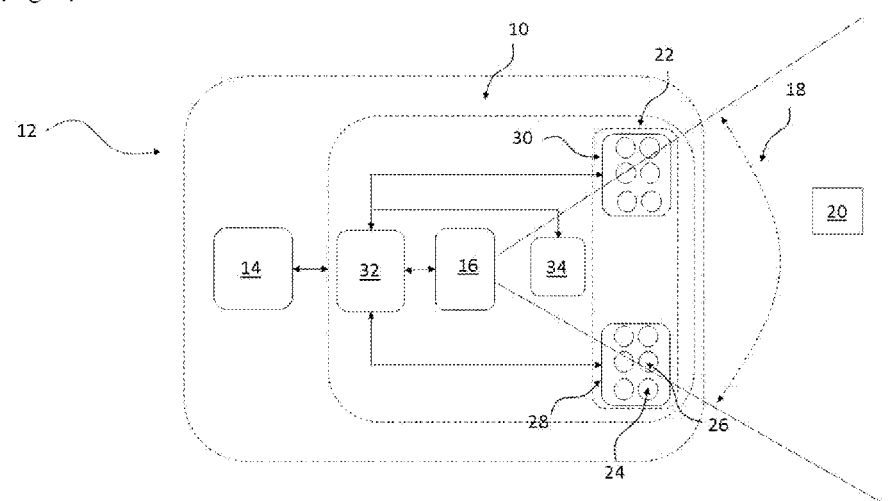

[Fig. 3]
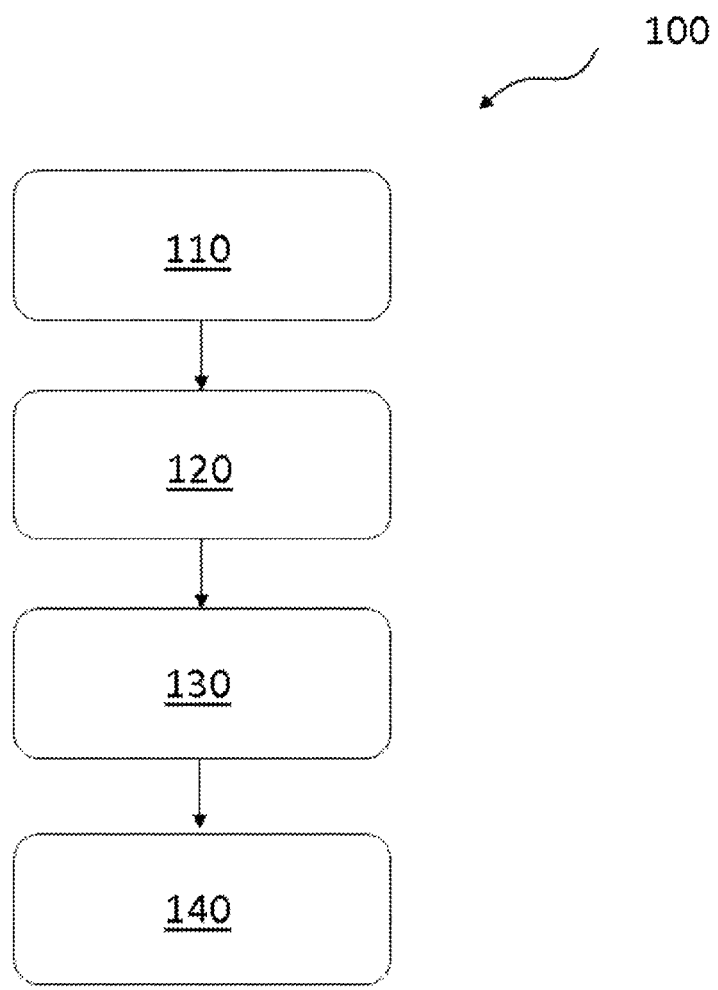

OBJECT DETECTION SYSTEM FOR A MOTOR VEHICLE

CROSS REFERENCE TO RELATED APPLICATIONS

This application claims priority to French Patent Application No. 19 04156, filed on Apr. 18, 2019.

TECHNICAL FIELD

The present invention relates to an object detection system for a motor vehicle, more particularly to a detection system capable of determining the nature of an object detected on the path of the vehicle running in reduced light conditions.

STATE OF THE ART

In the field of the motor vehicles, it is known to use a camera at the front of the vehicle in order to detect and recognize obstacles in the path of the vehicle such as road signs or other road users such as pedestrians or other vehicles.

In reduced visibility conditions, the cameras generally comprise their own lighting device arranged with the camera so as to be able to illuminate the field of vision of the camera. These lighting devices are generally bulky, expensive, energy-consuming and are also limited in performance by the miniaturization of the camera and therefore of its lighting elements.

It is therefore important to propose a new solution to solve this problem.

SUMMARY OF THE INVENTION

In an illustrative example embodiment, a vision system for a motor vehicle includes an optical image capture device configured to capture images of objects in its field of vision; a lighting device including a plurality of lighting elements forming a lighting matrix configured to illuminate the field of vision of the optical device; a control device electrically connected to the optical device and to the lighting device, the control device being configured to determine the nature of each image of an object captured by the optical device; the control device being configured to locate the object, select the lighting elements of the lighting matrix capable of illuminating the object relative to the location of the object and individually control the lighting characteristics of each selected lighting element so as to be able to determine the nature of the image of the object captured by the optical device.

The control device can be configured to adjust the lighting characteristics during a temporary time sequence which is not perceptible by the human eye, preferably less than 10 milliseconds. The control device can be configured to adjust the lighting characteristic of lighting power of each lighting element of the lighting matrix making it possible to illuminate the captured object.

The plurality of lighting elements forming a lighting matrix may include a plurality of 'red-green-blue' light-emitting diodes, the control device being configured to individually adjust the color of the light-emitting diodes of each lighting element of the lighting matrix making it possible to illuminate the captured object.

The vision system may further include an object detection device configured to detect the presence, in the field of vision of the optical device, of at least one object, the control device being configured to individually adjust the lighting characteristics of each lighting element of the lighting matrix making it possible to illuminate the object detected by the object detection device so that the control device can determine the nature of the image of the object captured by the optical device.

The vision system is able to be onboard a motor vehicle so that the vision system can be electrically connected to a driver assistance device of the vehicle, the lighting device may include at least one headlight device of the vehicle; the optical image capture device may include a vehicle camera configured to capture the images of objects in a front field of vision of the vehicle.

According to an illustrative example embodiment, an object detection method including the vision system described above includes: detecting an object in the field of vision of the optical device; locating the object detected following the detection step; selecting the lighting elements of the lighting matrix capable of illuminating the object detected relative to the location of the detected object; adjusting the lighting characteristics of the lighting elements illuminating the detected object allowing the determination of the nature of the detected object.

Detecting an object in the field of vision of the optical device can comprise the detection of the object by a device for detecting an object in the field of vision of the optical device.

Adjusting the lighting characteristics can comprise the adjustment of the lighting power of each selected lighting element of the lighting matrix.

Adjusting the lighting characteristics can be effective during a temporary time sequence not perceptible by the human eye, preferably less than 10 milliseconds.

BRIEF DESCRIPTION OF THE DRAWINGS

Various features and advantages of at least one example embodiment of the present invention will become apparent from the following description, and the appended drawings, given by way of non-limiting example and in which:

FIG. 1 represents an example vision system for a motor vehicle according to an embodiment of the invention.

FIG. 2 represents another example embodiment of the vision system for a motor vehicle.

FIG. 3 represents an example of a flowchart of an object detection method including the vision system of FIG. 1.

DETAILED DESCRIPTION

FIG. 1 schematically illustrates a vision system 10 for a motor vehicle 12. The vision system 10 cooperates with a driver assistance system 14 of the vehicle 12 making it possible in particular to activate the security functions of the vehicle 12 such as, for example, and without limitation, the emergency braking in the event of late detection of obstacle in the path of the vehicle 12. The vision system 10 mainly comprises an optical device 16 for capturing images such as a camera making it possible to capture images in its field of vision 18. According to the embodiment represented in the FIG. 1, the camera is arranged at the front of the vehicle 12, in the central position, so as to be able to capture images in the front field of vision of the vehicle 12, that is to say so as to be able to detect objects 20 in the path of vehicle 12.

According to the embodiment of FIG. 1, the vision system 10 includes a lighting device 22 configured to illuminate the field of vision 18 of the optical device 16 so as to be able to light the objects 20 lying in the path of the vehicle 12. More particularly, the lighting device 22 of the field of vision 18 of the optical device 16 includes the headlight device of the vehicle 12, the headlights including a plurality of lighting elements 24, 26 forming at least one lighting matrix 28, 30 configured to illuminate the front field of vision of the vehicle 12. More particularly, the plurality of lighting elements 24, 26 of the headlights of the vehicle 12 includes a plurality of power light-emitting diodes (commonly called LED lights) configured to illuminate the field of vision 18 of the optical device 16.

The vision system 10 also includes a control device 32 electrically connected to the optical device 16 and to the lighting device 22, the control device 32 being configured to determine the nature of each image of object 20 captured by the optical device 16. The control device 32 can be either an independent intelligent electronic unit or an intelligent electronic unit forming an integral part of the optical image capture device 16 or even forming an integral part of the lighting device 22. The control device 32 can comprise a microcontroller or any other digital signal processing device, as well as a memory block which may comprise an object signature library 20 allowing the recognition of the nature of objects 20 detected by an object detection device 20 such as the optical device 16 or by a radar device or even by a lidar-type device.

By "determining the nature of an object 20" is meant recognition of the object 20. Concretely, an object 20 can be detected by a device without recognizing the object 20. An object 20 on the trajectory of the vehicle 12 can be detected, so that the vehicle 12 must avoid it without having to know the type of object 20 that has been detected. However, according to the invention, the vision system 10 is a system whose purpose is to determine the nature of the object 20, namely, for example and without limitation, if the detected object 20 is a pedestrian, a bicycle, or a road sign containing a speed limit.

When the vehicle 12 is running in a reduced light condition, for example in night condition, when crossing a tunnel or even when crossing a blanket of fog, the control device 32 is configured to activate the lighting necessary for the optical device 16 in order to be able to recognize the nature of the image of the captured object 20 as well as its behavior.

More particularly, the control device 32 is configured to individually control the lighting characteristics of each lighting element 24, 26 of the lighting matrix 28, 30 illuminating the captured object 20 so as to be able to determine the nature of the image of the object 20 captured by the optical device 16.

More specifically, when the object 20 is detected by the optical device 16 but whose nature is not recognized by the control device 32, said control device 32 allows an adjustment of the lighting characteristics of the lighting elements 24, 26 of the lighting matrix 28, 30 making it possible to illuminate the object 20. The control device 32 is therefore configured to locate the object 20 detected by the optical device 16 and therefore capable of selecting the lighting elements 24, 26 of the lighting matrix 28, 30 making it possible to illuminate the object 20 while adjusting the lighting parameters of said selected lighting elements 24, 26 so that the optical device 16 can determine the nature of the image of the object 20 previously detected by the optical device 16.

Preferably, the lighting characteristic of lighting power of the lighting elements 24, 26 making it possible to illuminate the captured object 20 is adjusted to its maximum power to improve the capture of the image of the object 20 by the optical device 16. In order not to disturb either the driver of the vehicle 12 equipped with the vision system 10 according to the invention, or other vehicles traveling in the lighting fields of the vehicle 12, the control device 32 can be configured to adjust the lighting characteristics during a temporary time sequence not perceptible by the human eye, preferably less than 10 milliseconds. In order to minimize the energy consumption of the vision system 10, thanks to the recent image capture technologies, an increase in the lighting power to its maximum of the lighting elements 24, 26 making it possible to illuminate the object 20 captured during a duration of 5 ms, is sufficient for an optimal acquisition by the optical device 16 of an image of the object 20.

Alternatively or additionally, the plurality of lighting elements 24, 26 forming a lighting matrix 28, 30 can include a plurality of 'red-green-blue' light-emitting diodes so that the control device 32 can be configured to individually adjust the color of the light-emitting diodes of each lighting element 24, 26 of the lighting matrix 28, 30 making it possible to illuminate the captured object 20. This technical solution therefore allows lighting an object 20 which has been previously detected according to a regulatory lighting mode of the headlights of the vehicle 12 but not recognized by the control device 32, according to a color more favorable to the recognition of the object 20, that is to say according to a light wave of wavelength more favorable to the capture of the image of the object 20 by the optical device 16. By "wave of wavelength more favorable to the capture of the image of the object 20 by the optical device 16" is meant a wave allowing better reflection of said wave on an object than another wave of another wavelength.

This change in color of the lighting elements 24, 26 of the lighting matrix 28, 30 making it possible to illuminate the object 20 must be done in a manner not perceptible by the human eye and therefore during a temporary time sequence not perceptible by the human eye, preferably less than 10 milliseconds.

According to the embodiment of FIG. 1, the control device 32 is also capable of being periodically able to individually adjust the lighting characteristics of each lighting element 24, 26 of the lighting matrix 28, 30 by a sequential scanning of all the lighting elements 24, 26 of the lighting matrix 28, 30. Each lighting element 24, 26 can be adjusted for a maximum duration of 10 milliseconds, another lighting element 24, 26 being also adjusted subsequently, and so on for all of the individual lighting elements 24, 26. A period of time of duration greater than 50 ms between the adjustment of each lighting element allows obtaining a temporary time sequence not perceptible by the human eye.

According to FIG. 2, the same elements as FIG. 1 are represented and keep the same references. The vision system 10 further includes a device for detecting 34 objects 20 of the type detection and estimation of the distance by light or laser that is to say of the Lidar type or of the type detection and estimation of the distance by electromagnetic waves, that is to say of the Radar type.

The object 20 detection device 34 is configured to detect the presence, in the field of vision 18 of the optical device 16, of at least one object 20. This embodiment allows the control device 32, in communication with the object 20 detection device 34, to be able to individually adjust the lighting characteristics of each lighting element 24, 26 of the lighting matrix 28, 30 making it possible to illuminate the object 20 detected by the object 20 detection device 34 even when the optical device 16 has not been able to detect the object 20 beforehand. More specifically, the object 20 detection device 34 allows the control device 32 to locate an object 20 detected by said object 20 detection device 34 and therefore to select the lighting elements 24, 26 of the lighting matrix 28, 30 making it possible to illuminate the object 20 while adjusting the lighting parameters of said selected lighting elements 24, 26 so that the optical device 16 can capture the image of the object 20 detected by the object 20 detection device 34 and so that the control device 32 can determine the nature of the image of the object 20 thus captured by the optical device 16.

The embodiment of FIG. 2 can also allow the control device 32 to combine the information received from the optical device 16 such as the detection of an object 20 on the trajectory of the vehicle 12 with the information received from the object 20 detection device 34 so as to confirm or not the presence or non-presence of an object 20 on the trajectory of the vehicle 12. Preferably, the control device 32 can consider that an object 20 detected by the optical image capture device 16 but not detected by the object 20 detection device 34 is a false detection so that the lighting adjustment may be unexecuted.

Conversely, when an object 20 is detected by the object 20 detection device 34 and therefore also located, the control device 32 is therefore configured to analyze the image captured by the optical device 16 so that either the nature of the image of the object 20 is recognized and no lighting adjustment is necessary, or the nature of the image of object 20 is not recognized and the lighting adjustment is necessary. It should be understood by 'nature of the image of the object 20 not recognized', the case where the optical device 16 has not detected the object 20 or even the case where the optical device 16 has detected the object 20 but the control device 32 could not determine the nature of the image of the object 20.

According to FIG. 3, an object 20 detection method 100 including the vision system 10 of the invention includes a step of detecting 110 an object 20 in the field of vision 18 of the optical device 16 so that the method 100 comprises a step of locating 120 the detected object 20. The location of the detected object 20 can be carried out by the control device 32 which can analyze the images captured by the optical device 16, or by analyzing the data of a device for detecting 34 objects 20 in the field of vision 18 of the optical device 16.

The method 100 further comprises a step of selecting 130 the lighting elements 24, 26 of the lighting matrix 28, 30 capable of illuminating the object 20 detected relative to the location of the detected object 20.

Then the method 100 comprises a step of adjusting 140 the lighting characteristics of the selected lighting elements 24, 26 of the lighting matrix 28, 30 thus allowing the determination of the nature of the detected object 20. The step of adjusting 140 the lighting characteristics may comprise the adjustment of the lighting power of each selected lighting element 24, 26 of the lighting matrix 28, 30 making it possible to illuminate the detected object 20.

In the case of lighting elements 24, 26 including a plurality of 'red-green-blue' light-emitting diodes, the adjustment step 140 may also comprise a step of adjusting the lighting color of the object 20 by the 'red-green-blue' light-emitting diodes of the lighting matrix 28, 30 making it possible to illuminate the captured object 20. Preferably, the step of adjusting 140 the lighting characteristics is effective during a temporary time sequence not perceptible by the human eye, preferably less than 10 milliseconds.

We claim:

1. A vision system for a motor vehicle, comprising:
an optical device comprising a camera configured to capture images of objects in a field of vision of the optical device;
a lighting device including a plurality of lighting elements forming a lighting matrix configured to illuminate the field of vision of the optical device; and
a control device associated with the optical device and the lighting device, the control device being configured to determine a nature of an object in an image captured by the camera, the control device being configured to
determine a location of the object by analyzing the image captured by the camera, and
process the image captured by the camera to identify the nature of the object;
wherein
when the control device cannot determine the nature of the object by analyzing the image captured by the camera, the control device is configured to select the lighting elements of the lighting matrix capable of illuminating the object based on the determined location of the object,
individually control at least one lighting characteristic of each selected lighting element
during a temporary time sequence imperceptible by the human eye, and
determine the nature of the object by analyzing at least one other image captured by the camera during the temporary time sequence.

2. The system according to claim 1, wherein the control device is configured to adjust the at least one lighting characteristic by adjusting a lighting power of each lighting element of the lighting matrix making it possible to illuminate the object in the at least one other image.

3. The system according to claim 1, wherein
the plurality of lighting elements forming a lighting matrix includes a plurality of red-green-blue light-emitting diodes, and
the control device is configured to individually adjust a color of the light-emitting diodes of each lighting element of the lighting matrix.

4. The system according to claim 1, comprising a radar or lidar object detection device configured to detect the presence of at least one object in the field of vision of the optical device, the control device being configured to individually adjust the at least one lighting characteristic of each lighting element of the lighting matrix to illuminate the object detected by the object detection device so that the control device can determine the nature the object in a subsequent image captured by the optical device.

5. The system according to claim 1, wherein
the vision system is associated with a driver assistance device of the vehicle,
the lighting device includes a headlight of the vehicle,
the field of vision of the optical device corresponds to a field of vision in front of the vehicle.

6. An object detection method using the vision system of claim 1, the method comprising:
detecting an object in the field of vision of the optical device;
locating the object subsequent to the detecting by analyzing an image captured by the camera;
selecting the lighting elements of the lighting matrix capable of illuminating the object based on the location of the detected object;

adjusting the at least one lighting characteristic of the lighting elements illuminating the detected object during a temporary time sequence imperceptible by the human eye; and determining the nature of the object by analyzing the at least one other image captured by the camera during the temporary time sequence.

7. The method according to claim 6, wherein detecting the object in the field of vision of the optical device comprises using a radar or lidar device for detecting objects in the field of vision of the optical device.

8. The method according to claim 6, wherein adjusting the at least one lighting characteristic comprises adjusting a lighting power of each selected lighting element of the lighting matrix.

9. The method according to claim 6, wherein determining the nature of the object comprises identifying a type of the object.

10. The method according to claim 9, wherein identifying the type of the object includes determining whether the object is a pedestrian.

11. The method according to claim 9, wherein identifying the type of the object includes determining whether the object is a bicycle.

12. The vision system according to claim 1, wherein the control device is configured to determine the nature of the object in the image captured by the optical device by identifying a type of the object.

13. The vision system according to claim 12, wherein identifying the type of the object includes determining whether the object is a pedestrian.

14. The vision system of claim 12, wherein identifying the type of the object includes determining whether the object is a bicycle.

* * * * *